(12) United States Patent
Mock

(10) Patent No.: US 8,011,801 B2
(45) Date of Patent: Sep. 6, 2011

(54) DIGITAL PICTURE DISPLAY DEVICE

(76) Inventor: Jason Mock, Clermont, FL (US)

( * ) Notice: Subject to any disclaimer, the term of this patent is extended or adjusted under 35 U.S.C. 154(b) by 222 days.

(21) Appl. No.: 12/508,656

(22) Filed: Jul. 24, 2009

(65) Prior Publication Data

US 2011/0019110 A1    Jan. 27, 2011

(51) Int. Cl.
*F21V 33/00* (2006.01)
(52) U.S. Cl. .................. 362/234; 362/249.02; 362/253; 362/458; 362/806; 40/714; 40/737
(58) Field of Classification Search .................. 362/234, 362/249.01–249.02, 253, 458, 806; 345/46, 345/48, 50, 87; 40/406, 541, 544, 549, 564, 40/700, 714–716, 737
See application file for complete search history.

(56) References Cited

U.S. PATENT DOCUMENTS

2005/0057578 A1* 3/2005 Chen et al. .................. 345/630
* cited by examiner

*Primary Examiner* — Jason Moon Han
(74) *Attorney, Agent, or Firm* — Matthew G. McKinney; Shuffield, Lowman & Wilson, PA

(57) ABSTRACT

A digital picture display is disclosed. In a particular embodiment, the device includes a main body, a removable decorative faceplate adapted to be secured to a front portion of the main body, and an internal casing seated within the main body. An annular sidewall extends frontward from a periphery of the internal casing and a plurality of notches are disposed in the annular sidewall of the internal casing to receive a plurality of light emitting diodes. A liquid crystal display is housed within the internal casing, wherein the liquid crystal display is in electrical communication with electronic circuitry. The internal casing also includes a non-volatile memory that stores digital images to view on the liquid crystal display. In addition, the decorative faceplate includes at least one latch to removably secure the faceplate to the main body.

14 Claims, 4 Drawing Sheets

DIGITAL PICTURE DISPLAY DEVICE

I. CROSS-REFERENCED TO RELATED APPLICATIONS

This application is a continuation of U.S. patent application Ser. No. 11/953,462 filed Dec. 10, 2007, entitled "Digital Picture Display Ornament with LEDS."

II. FIELD OF THE DISCLOSURE

The present disclosure is generally related to a digital picture display device.

III. BACKGROUND

Digital cameras have become the preferred choice for a large number of consumers due in part to the convenience of not being required to purchase and develop photographic film. Most digital cameras employ a charge coupled device, which includes a large number of diodes called pixels that convert photons into electrons. An electrical charge is accumulated by each pixel as it receives light and determines the intensity of the light. Various methods of using red, blue and green filters produce the full color image. The digital camera captures images and stores pictures in non-volatile memory using techniques well known in the field. The digital images can be downloaded to a computer using a serial, parallel, SCSI or universal serial bus port. Removable memory is also common in digital cameras in addition to using floppy disks or writable CDs.

There have been attempts to develop devices other than computers or printers that are capable of receiving and displaying digital pictures. For example, a picture frame may be used for displaying digital images taken by a digital camera. The frame may be a wall mounted frame or desk top frame that displays digital pictures when a motion sensor of the frame is activated. A shortcoming is that the frame is a conventional type frame and is not adaptable to accentuate the digital images being displayed using specialized lighting effects. Accordingly, what is needed in the art is a more elaborate device for displaying digital images that captures the user's attention.

Another need exists in the art for an improved digital picture display that is customized to coordinate to a particular time of year or holiday.

Another need exists in the art for an improved digital picture display that is readily adaptable to suspend from a Christmas tree limb as an ornament.

Another need exists in the art for an improved digital picture display that is adaptable to display digital images stored and formatted as JPEG, .bmp, .png, or .gif files.

Another need exists in the art for an improved digital picture display that can be powered by connecting to a string of lights using a vacated light bulb socket.

However, in view of the prior art at the time the present invention was made, it was not obvious to those of ordinary skill in the pertinent art how the identified needs could be fulfilled.

It is, therefore, to the effective resolution of the aforementioned problems and shortcomings of the prior art that the present invention is directed.

IV. SUMMARY

In a particular embodiment, a digital picture display device is disclosed. The device includes a main body, a removable decorative faceplate adapted to be secured to a front portion of the main body, and an internal casing seated within the main body. An annular sidewall extends frontward from a periphery of the internal casing and a plurality of notches are disposed in the annular sidewall of the internal casing to receive a plurality of light emitting diodes (LEDs). A liquid crystal display is housed within the internal casing, where the liquid crystal display is in electrical communication with electronic circuitry. The internal casing also includes a non-volatile memory that stores digital images to view on the liquid crystal display. In addition, the decorative faceplate includes at least one latch to removably secure the faceplate to the main body.

Accordingly, an advantage of the digital picture display device is to provide a more elaborate device for displaying digital images that captures the viewer's attention.

Another advantage of the digital picture display device is to provide an improved digital picture display that is customized to coordinate to a particular time of year or holiday.

Also, the digital picture display device has the advantage to be suspended from a Christmas tree limb as an ornament.

Yet another advantage of the digital picture display device is to ability to display digital images stored and formatted as a number of different file formats such as JPEG, .bmp, .png, or .gif files.

In addition, the digital picture display device has the advantage to be powered by connecting to a string of lights using a vacated light bulb socket.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

For a fuller understanding of the nature and objects of the invention, reference should be made to the following detailed description, taken in connection with the accompanying drawings, in which.

VI. DETAILED DESCRIPTION

Figure 1:
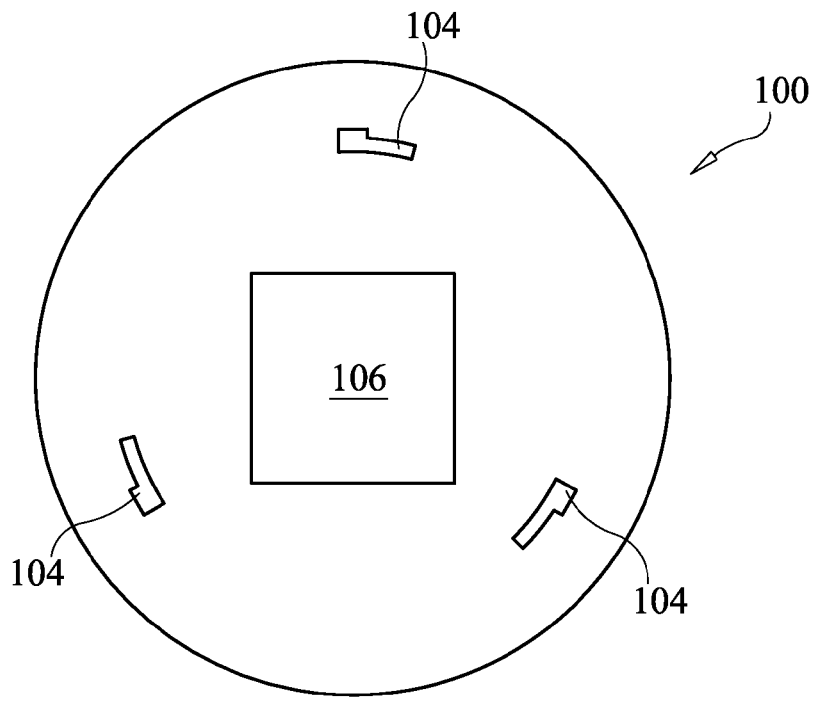
FIG. 1 is a front view of a main body of a particular embodiment of a digital picture display device.
Figure 2:
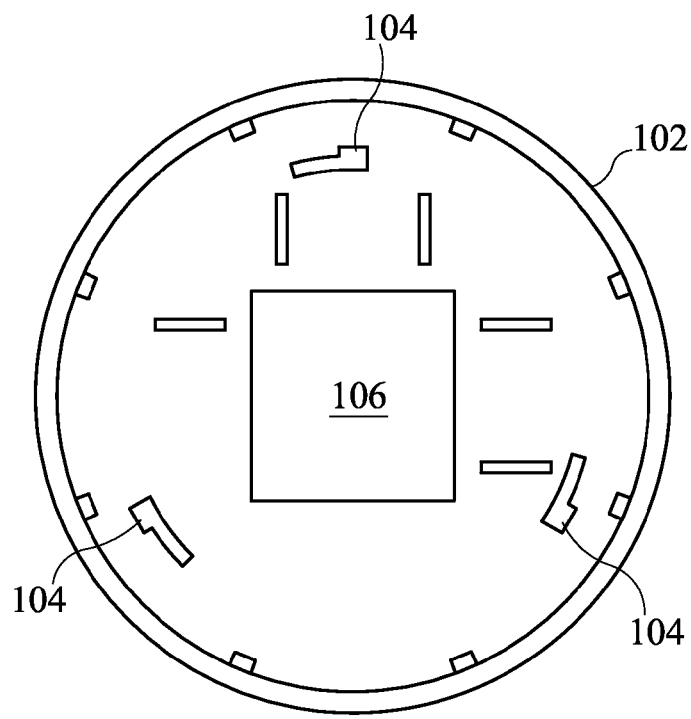
FIG. 2 is a rear view of the main body of the digital picture display device of FIG. 1.

Referring to FIG. 1, a particular illustrative embodiment of a digital picture display device is disclosed and generally designated 100. The device 100 in the preferred embodiment is generally cylindrical in shape including a main body 102 having a front circular portion for receiving a removable decorative faceplate as explained below. The device 100 may also be rectangular, triangular, or any other desired shape. An annular sidewall extends rearward from a periphery of the front portion of the main body 102 forming a void to house the internal casing of the device 100 within the main body 102. Both the sidewall of the main body 102 and the front portion may be comprised of a rigid transparent or translucent material such as polyethylene as will be explained below. A window 106 may be disposed on the main body 102 to provide for a liquid crystal display ("LCD") of the device 100 to be seated and viewable through the main body 102. The LCD screen is in electrical communication with electronics stored within the internal casing of the device 100. At least one slot 104 is disposed on the main body 102 to secure a removable decorative faceplate to the front portion of the main body 102. The rear of the main body 102 is visible in FIG. 2, which shows the sidewall of the main body 102 extending rearward from the periphery of the front portion. Each slot 104 for securing the faceplate includes a wide portion that transitions to a narrow portion and each slot is adapted to receive a latch of the faceplate.

Figure 3:
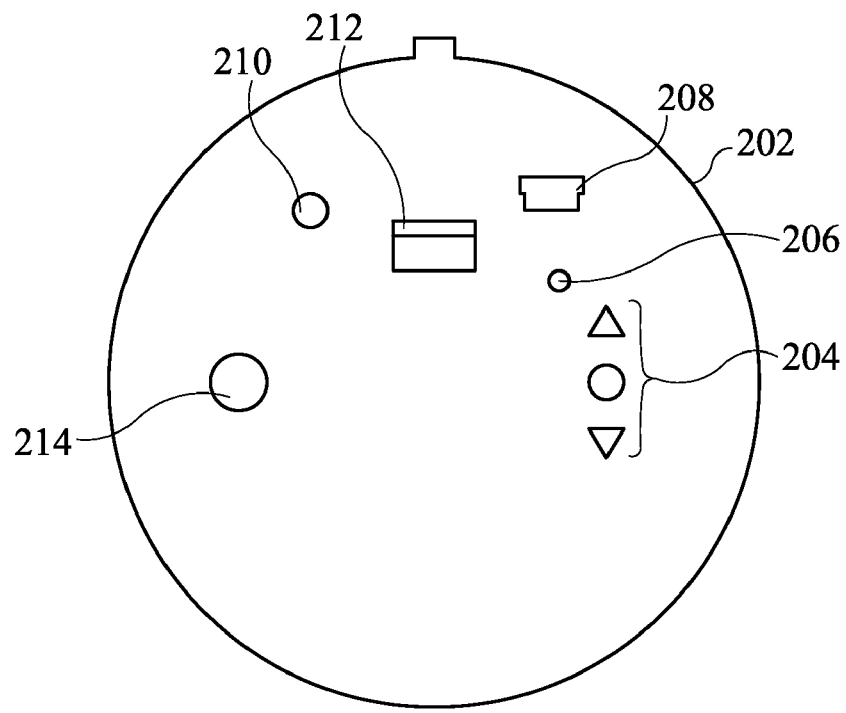
FIG. 3 is a front view of an internal casing of the particular embodiment of the digital picture display device.

Referring now to FIG. 3, an internal casing 202 includes an annular sidewall extending frontward from the periphery that forms a void to house various electronic elements for the device 100. The internal casing 202 is configured to be seated within the main housing 102. The internal casing 202 includes multiple user interface controls so that the user can activate and control a microprocessor of the device 100. For example, a menu button 214 may be used to turn the electronics of the device 100 on and off or to access the menu screen. A universal serial bus ("USB") port 208 allows the user to connect to a personal computer, for example, for uploading and downloading digital pictures through software to non-volatile memory within the internal casing 202. A pair of scroll buttons 204 (one "up" and one "down" button) allows the user to select pictures and also to select and scroll through features on the menu screen. A power port 206 is provided so that an external power source can be coupled to the device 100. A reset button 210 allows the user to clear the non-volatile memory of downloaded digital pictures. The device 100 may be used to display digital pictures or videos as a slide show. In addition, the inner casing 202 includes an aperture 212 to secure a removable leg stand for desktop use.

Figure 4:
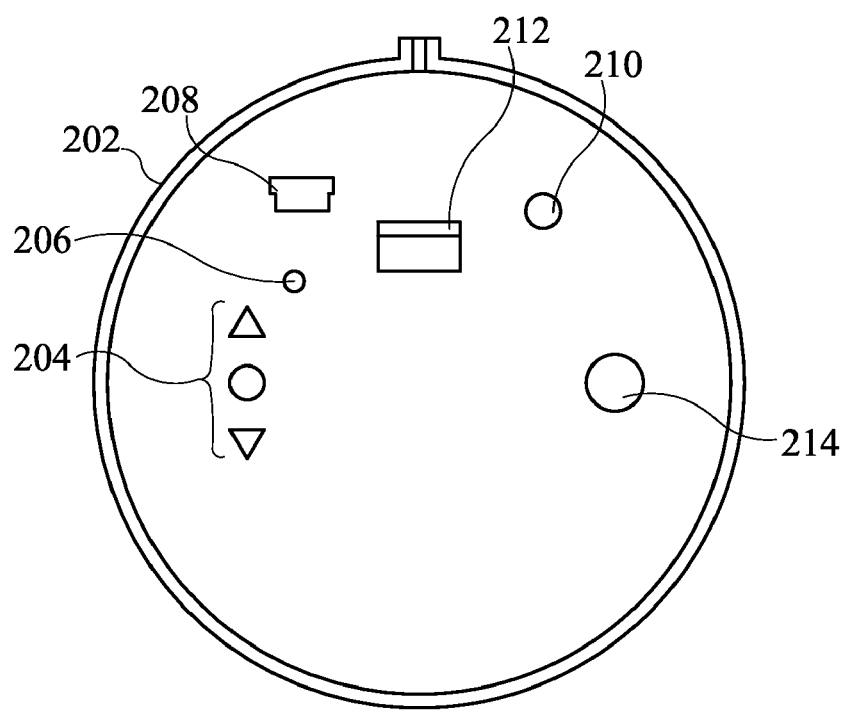
FIG. 4 is a rear view of the internal casing of the digital picture display device.
Figure 5:
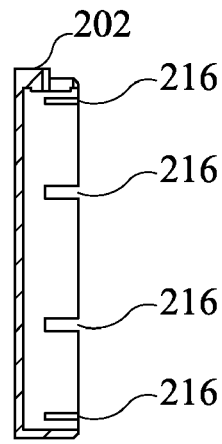
FIG. 5 is a cross sectional view of the internal casing of the digital picture display device.

The sidewall of the internal casing 202 extends frontward from the periphery of the internal casing 202 as illustrated in FIGS. 4 and 5. A plurality of notches 216 are disposed on the sidewall and each notch is configured to receive a LED mounted about the periphery of the inside casing 202 of the device 100. The LEDs are orientated such that when illuminated, the LEDs are visible through the main body. The LEDs may be any desired color. The LEDs are in electrical communication with circuitry and a microprocessor that controls the operation of the LEDs. In one embodiment, an AC/DC transformer is plugged into a 110V wall outlet and the other end plugs directly into the device 100 to supply power. In another embodiment, an internal power supply, such as a battery, is provided and may be rechargeable. In yet another embodiment, the device may be plugged directly into a light socket after removing the light bulb from an existing string of Christmas lights.

Figure 6:
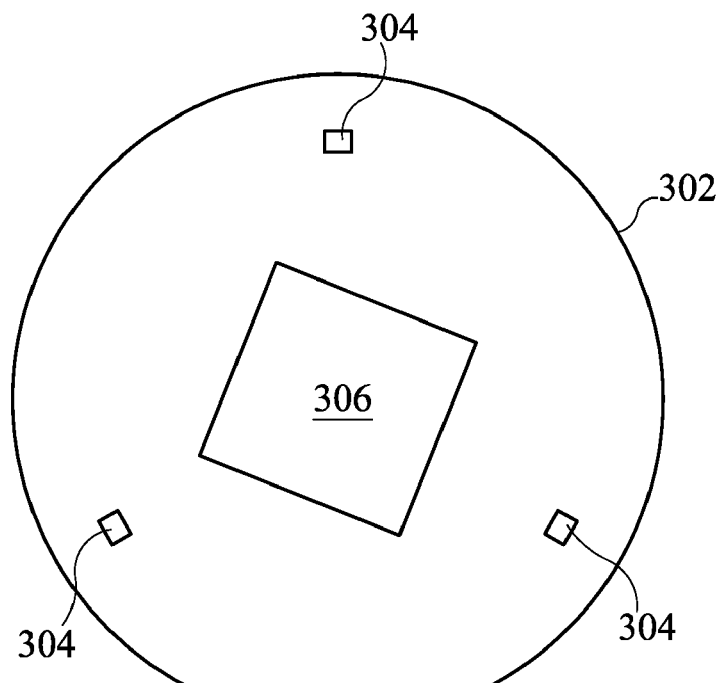
FIG. 6 is a front view of a faceplate of the digital picture display device.
Figure 7:
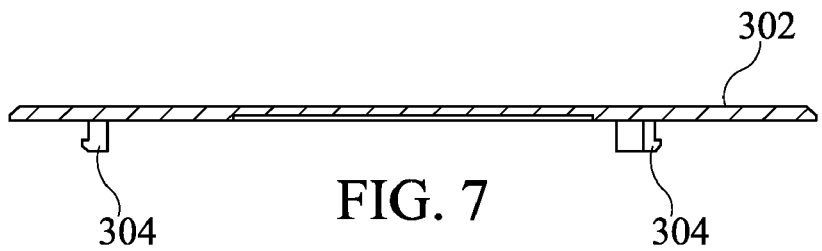
FIG. 7 is an elevational view of the faceplate.
Figure 8:
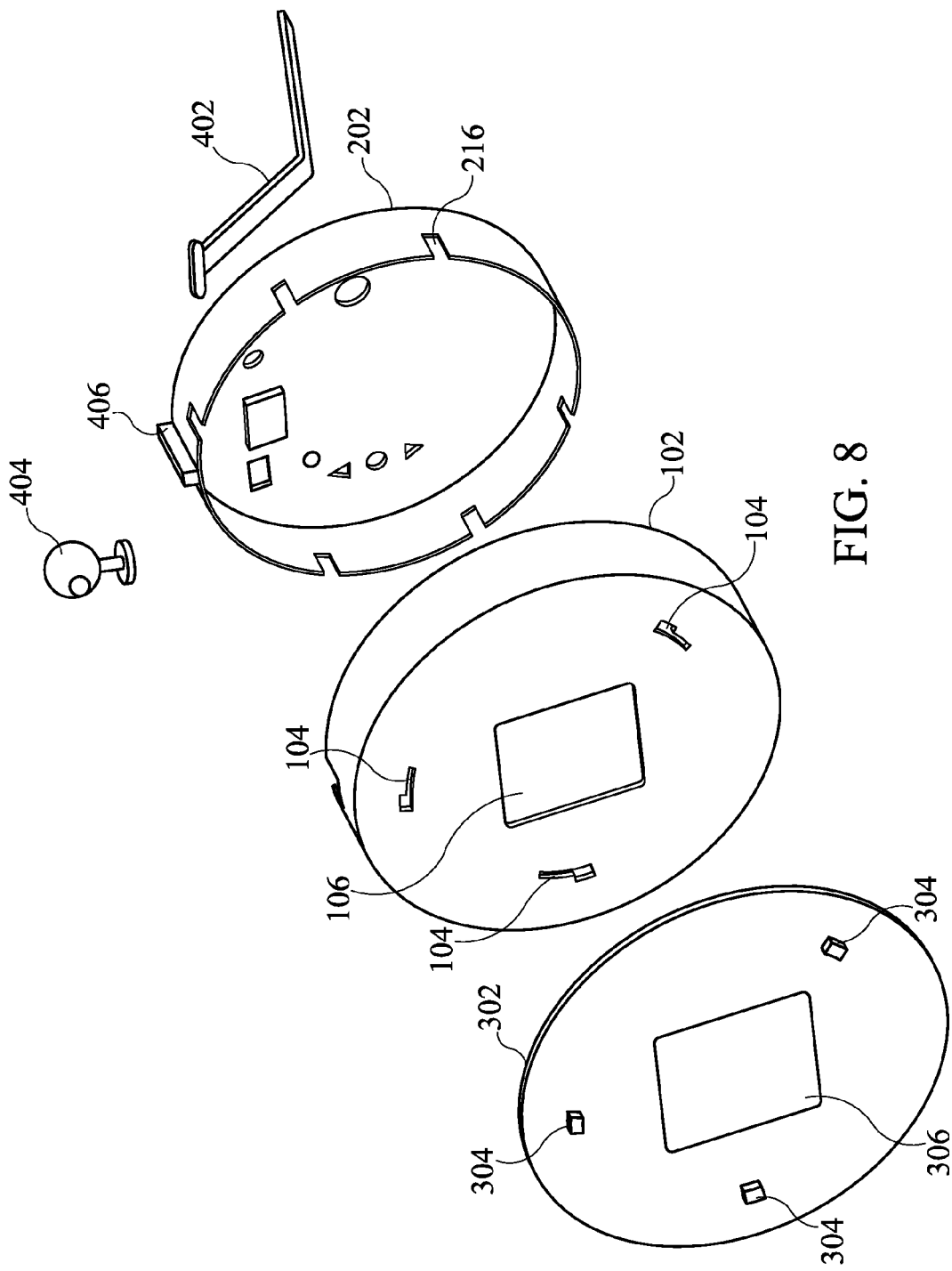
FIG. 8 is a perspective exploded view of the digital picture display device.

The removable faceplate 302 is adapted to be secured to the front of the main body using at least one latch 304 as shown in FIGS. 6 and 7. Each latch 304 extends from a rear of the faceplate 302 and is adapted to slide within the slot 104 disposed on the front portion of the main body 102 that correlates with a location of each latch 304. The faceplate 302 is generally of similar size and shape of the front portion of the main body 102. In operation, the faceplate 302 is positioned over the main body 102, with each latch 304 slidingly engaging the wide portion of a respective slot 304. The faceplate is then rotated so that each latch 304 slides to the narrow portion of each respective slot and locks in place. Each latch 304 has a lip on its distal end to secure each latch within the narrow portion of the slot 304. Although a latch and slot system is disclosed as the preferred means to secure the faceplate 302 to the main body 102, any other means may be used such as adhesive, Velcro, screws, bolts, magnets, etc., to secure the faceplate 302 to the main body 102.

The sidewall of the internal casing 202 slides adjacent to the sidewall of the main body 102, which may be transparent or translucent as discussed above. Accordingly, when the LEDs are illuminated, light is reflected outwards from the internal casing 202 and passes through the transparent or translucent sidewall of the main body 102 and is visible to the user. The LEDs are in electrical communication with the microprocessor that controls the illumination of the LEDs. The microprocessor also controls the LCD screen for displaying and accessing digital photographs from the memory of the device 100. In addition, the faceplate 302 may include a design so that the LEDs illuminate strategically placed graphic elements. For example, the decorative faceplate may have graphic elements that appear to be Christmas lights. Accordingly, as the LEDs are illuminated, the graphic elements glow from underneath providing an appearance that the graphic elements are illuminated and providing a desirable frame for the pictures. Moreover, the LEDs illuminate the periphery of the device 100 providing a lighting effect that the device 100 is glowing. The faceplate 302 may have the appearance of being related to a specific holiday or time of year. For example, the faceplate 302 may display Thanksgiving, Christmas, Halloween, etc., greetings or symbols.

Referring now to FIG. 7, a removable leg stand 402 may be secured to the rear surface of the internal casing 210. The leg stand 402 is fixed at an angled position with a first end resting on a flat surface (not shown). A second end of the leg stand 402 may be hingedly mounted to the device 100 such that the device 100 is supported in an upright position so that the LCD screen is easily viewable. The leg stand 402 may be removed when the leg stand 402 is not required. The perspective exploded view of the device 100 illustrates the sidewall of the main body 102 extending from the front portion to form a void for receiving the internal casing 202. The sidewall of the internal casing 202 fits snugly against an inner portion of the sidewall of the main body 102 when seated properly. Three slots 104 are placed equidistantly about the front portion of the main body 102 and are aligned with the latches 304 of the faceplate 302. A window 306 of the faceplate 302 is aligned with the window 106 of the main body for viewing the LCD. Both windows 106, 306 are generally in the central portion of the main body 102 and faceplate 302, respectively. In the preferred embodiment, the sidewall of the main body 102 is a translucent plastic material. In an alternative embodiment, the sidewall is not a solid material but is filled with fluid to enhance the illumination from the LEDs and to act as a heat exchanger to cool the circuitry housed within the internal casing 202. The microprocessor and associated circuitry is mounted to the internal casing 202. The device 100 is adaptable to be suspended from a protrusion 404 disposed at a top portion 406 of the device 100. Also, the device 100 may be supported at an angled position by the leg stand 402, as shown in FIG. 7, when used on a flat surface.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A digital picture display device comprising:
   a translucent main body, wherein an annular sidewall extends rearward from a periphery of the main body;
   a removable decorative faceplate secured to a front of the main body;
   an internal casing seated within the main body, wherein an annular sidewall extends frontward from a periphery of the internal casing;
   a plurality of notches disposed in the annular sidewall of the internal casing that receive a plurality of light emitting diodes (LEDS); and
   a liquid crystal display housed within the internal casing, wherein the liquid crystal display is in electrical communication with electronic circuitry for displaying digital pictures or videos.

2. The digital picture display device of claim 1, wherein a rear surface of the main body further comprising at least one boss disposed thereon to secure the liquid crystal display.

3. The digital picture display device of claim 1, wherein the internal casing further comprising a microprocessor to control functions of the device.

4. The digital picture display device of claim 1, wherein the internal casing further comprising a non-volatile memory that stores digital images to view on the liquid crystal display.

5. The digital picture display device of claim 1, wherein a rear surface of the internal casing further comprising a plurality of user interface controls to activate and control the device.

6. The digital picture display device of claim 1, wherein the device is in electrical communication with an external power source.

7. The digital picture display device of claim 1, wherein the internal casing further comprising a protrusion disposed at a top portion of the device to suspend the device.

8. The digital picture display device of claim 1, wherein the decorative faceplate further comprising at least one latch to removably secure the faceplate to the main body.

9. The digital picture display device of claim 1, further comprising a removable leg stand to mount to a rear surface of the internal casing.

10. The digital picture display device of claim 1, wherein the internal casing is an opaque material.

11. The digital picture display device of claim 1, further comprising an internal power source.

12. The digital picture display device of claim 1, wherein the plurality of light emitting diodes are multi-colored.

13. The digital picture display of claim 1, wherein the decorative faceplate further comprising a window to view the liquid crystal display.

14. The digital picture display device of claim 8, wherein the main body further comprising at least one slot to receive the at least one latch of the decorative faceplate.

* * * * *